(12) United States Patent
Choi (10) Patent No.: US 9,221,463 B2
(45) Date of Patent: Dec. 29, 2015

(54) AUTOMATIC SPEED CONTROLLABLE VEHICLE AND METHOD FOR CONTROLLING SPEED THEREOF

(71) Applicant: HYUNDAI MOBIS CO., LTD., Seoul (KR)

(72) Inventor: A Ra Choi, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 14/249,502

(22) Filed: Apr. 10, 2014

(65) Prior Publication Data

US 2015/0149059 A1    May 28, 2015

(30) Foreign Application Priority Data

Nov. 26, 2013  (KR) .................. 10-2013-0144481

(51) Int. Cl.
*B60W 30/14*    (2006.01)

(52) U.S. Cl.
CPC .......... *B60W 30/146* (2013.01); *B60W 2550/30* (2013.01)

(58) Field of Classification Search
CPC .................. B60W 30/146; B60W 2550/30
See application file for complete search history.

(56) References Cited

U.S. PATENT DOCUMENTS

| 2007/0198162 A1* | 8/2007 | Kubota ........................ 701/96 |
| 2013/0015983 A1* | 1/2013 | Goudy et al. ................ 340/905 |
| 2013/0116861 A1* | 5/2013 | Nemoto ........................ 701/2 |
| 2013/0204505 A1 | 8/2013 | Sauer |

FOREIGN PATENT DOCUMENTS

| JP | 11-278098 A | 10/1999 |
| JP | 2011-100278 A | 5/2011 |
| KR | 10-2001-0061774 A | 7/2001 |
| KR | 10-2002-0051391 A | 6/2002 |
| KR | 10-0459350 B1 | 12/2004 |
| KR | 10-2005-0026127 A | 3/2005 |
| KR | 10-2013-0090953 A | 8/2013 |

OTHER PUBLICATIONS

Korean Office Action issued on Nov. 20, 2014 in counterpart Korean Application No. 10-2013-0144481 (in Korean, 4 pages).

* cited by examiner

*Primary Examiner* — James Trammell
*Assistant Examiner* — Anne Mazzara
(74) *Attorney, Agent, or Firm* — NSIP Law (57) ABSTRACT

Disclosed are an automatic speed controllable vehicle and a speed controlling method thereof. The vehicle collects vehicle information and transmitted collected vehicle information to an RSE, and the RSE receives vehicle information from each vehicle within a management section and transmits again, to each vehicle, information required for each vehicle to adjust a speed. The vehicle receiving information required to adjust the speed may adjust the speed of the vehicle based on the received information and may display a warning notification for a driver.

13 Claims, 3 Drawing Sheets

AUTOMATIC SPEED CONTROLLABLE VEHICLE AND METHOD FOR CONTROLLING SPEED THEREOF

CROSS-REFERENCE TO RELATED APPLICATIONS

This application claims priority to and the benefit of Korean Patent Application No. 10-2013-0144481 filed in the Korean Intellectual Property Office on Nov. 26, 2013, the entire contents of which are incorporated herein by reference.

TECHNICAL FIELD

The present invention relates to an automatic speed controllable vehicle and a speed controlling method thereof, and more particularly, to an automatic speed controllable vehicle and a speed controlling method thereof that may transmit vehicle data of an accident black spot through a communication between a vehicle and an infrastructure based on a communication technology between the vehicle and the infrastructure and an integrated controller and may automatically control the vehicle, thereby efficiently preventing an accident and minimizing damage.

BACKGROUND ART

A smart cruise control (SCC) function is installed in a large number of vehicles currently released in the market. The SCC function is applied with a cruise driving function for driving at a speed designated by a driver and an automatic inter-vehicle distance maintaining technology of maintaining a distance from a vehicle in front and when the vehicle in front stops, automatically stopping and then automatically starting.

An SCC module is generally attached to a front panel of a vehicle, and measures a distance from and a relative speed of a vehicle in front using a radar sensor mounted at the front of the vehicle and maintains a proper speed between the vehicles. The SCC module automatically controls an engine and a brake at a speed set by the driver. However, the SCC may quickly brake when the distance between the vehicle and the vehicle in front is insufficient due to an inflexible vehicle speed control.

Although a technology for flexibly controlling a speed of a vehicle based on an inter-vehicle distance is disclosed in Korean Patent No. 10-0459350, the inter-vehicle distance and the speed are only considered and a characteristic of a driving section in which the vehicle is driving is not considered.

Meanwhile, technologies associated with various traffic safety services, such as a quick braking warning service, a forward collision warning service, and an emergency vehicle priority signal control service, through a vehicle to vehicle (hereinafter, V2V) communication based on wireless access in vehicular environments (WAVE) and a vehicle to infrastructure (hereinafter, V2I) communication, are currently being developed. However, the existing V2V/V2I related services focus on an advance warning and braking related technology for preventing the aforementioned vehicle accident (collision or collision accident).

SUMMARY OF THE INVENTION

The present invention has been made in an effort to provide a vehicle that may transmit and receive vehicle data through a vehicle to infrastructure (V2I) communication in an accident black spot and automatically control a speed of a vehicle, thereby efficiently preventing an accident.

The present invention has also been made in an effort to provide a method of automatically controlling a speed of a vehicle to achieve the above object.

An exemplary embodiment of the present invention provides a vehicle including: a vehicle to everything (V2X) terminal configured to collect driving information, to transmit a transmission message to roadside equipment (RSE), and to generate control data and display data by analyzing and converting driving limit information when the RSE analyzes the number of vehicles within a management section, position information, and speed information from the driving information and transmits a reception message about the driving limit information including a predetermined speed limit and neighboring vehicle information; an integrated controller configured to receive the control data, to calculate a deceleration level, and to gradually decelerate a speed of a vehicle to be less than or equal to the speed limit based on the calculated deceleration level; and an interface unit configured to receive the display data, and to transmit the received display data to an audio/video/navigation (AVN) system capable of displaying a warning notification for a driver.

The V2X terminal may include: a controller area network (CAN) information collector configured to collect vehicle information including the vehicle speed from a plurality of sensors within the vehicle using a CAN communication; a differential global positioning system (DGPS) information collector configured to obtain position information of the vehicle; a basic safety message (BSM) generator configured to receive the vehicle information and the position information, to obtain the driving information, and to generate the driving information as a transmission BSM that is the transmission message corresponding to a wireless access in vehicular environments (WAVE) communication format; a WAVE data handler configured to receive the transmission BSM, to transmit the transmission BSM to the RSE, and to receive a reception BSM transmitted from the RSE; a driving limit information analyzer configured to receive the reception BSM, and to obtain the speed limit and the neighboring vehicle information included in the reception BSM, and warning data; a data converter configured to convert, to the control data, the speed limit, the neighboring vehicle information, and a warning level included in the warning data, and to transmit the control data to the integrated controller; and a CAN information generator configured to transmit the display data to the interface unit through the CAN communication.

When the neighboring vehicle information is not included in the control data, the integrated controller may calculate the deceleration level according to an equation:

$$RP=(SP_{cr}-SP_{lm})/(WL*10)$$

(here, RP denotes the deceleration level, $SP_{cr}$ denotes a current driving speed of the vehicle, $SP_{lm}$ denotes a driving speed limit of the vehicle, and WL denotes a warning level) and decelerates the speed of the vehicle based on the calculated deceleration level.

When the neighboring vehicle information is included in the control data, the integrated controller may calculate a relative speed that is a difference between the vehicle speed of the vehicle information and a speed of a vehicle at the back included in the neighboring vehicle information, and when the relative speed has a negative value, may calculate the deceleration level in consideration of a relative acceleration that is a difference between an acceleration of the vehicle and an acceleration of the vehicle at the back according to an equation:

$$RS=(|(\text{relative acceleration}/10)|*(SP_{cr}-SP_{lm}))/(WL*10),$$

(here, RS denotes the deceleration level, $SP_{cr}$ denotes a current driving speed of the vehicle, $SP_{lm}$ denotes a driving speed limit of the vehicle, and WL denotes a warning level) and decelerates the speed of the vehicle based on the calculated deceleration level.

When information about a vehicle at the back is included in the neighboring vehicle information, the integrated controller may adjust a deceleration interval based on a relative distance between the vehicle and the vehicle at the back.

The RSE may receive a transmission BSM, analyzes driving information of each of an at least one vehicle, may obtain the number of vehicles within the management section, the position information, and the speed information from the driving information, may generate the neighboring vehicle information including the position information and the driving information of another vehicle based on each of the at least one vehicle, may generate a reception BSM that is the reception message including the neighboring vehicle information and the speed limit and warning data predetermined and thereby stored, and may transmit the reception BSM.

Another exemplary embodiment of the present invention provides a method of controlling a speed of at least one vehicle configured to perform communication with RSE using a WAVE communication, the method including: collecting, by each of the at least one vehicle, driving information including speed information and position information of a vehicle, generating a transmission BSM corresponding to a WAVE communication format, and transmitting the transmission BSM to the RSE; receiving, by each of the at least one vehicle, a reception BSM that is transmitted from the RSE by analyzing the number of vehicles within a management section and driving information of each of the at least one vehicle, and by including driving limit information and neighboring vehicle information; and obtaining, by each of the at least one vehicle, a speed limit included in the driving limit information and the neighboring vehicle information, calculating a deceleration level based on a current speed of a vehicle exceeding the speed limit and the speed limit, and decelerating the speed of the vehicle based on the calculated deceleration level.

The receiving of the reception BSM may include: receiving, by the RSE, the transmission BSM from each of the at least one vehicle, and analyzing the number of vehicles within the management section of the RSE and the driving information of each of the at least one vehicle; determining, by the RSE, whether a speed of each of the at least one vehicle exceeds the predetermined speed limit; transmitting, by the RSE, the reception BSM including driving limit information to the vehicle of which the vehicle speed exceeds the speed limit among the at least one vehicle; and receiving, by the vehicle of which the vehicle speed exceeds the speed limit among the at least one vehicle, the reception BSM.

The transmitting of the reception BSM includes obtaining, by the RSE, a warning level corresponding to the speed of the vehicle exceeding the speed limit in the driving information from among a plurality of predetermined warning levels; determining, by the RSE, whether a vehicle driving at the back of the vehicle of which the vehicle speed exceeds the speed limit is present within the management section; obtaining, by the RSE, neighboring vehicle information including position information and speed information of the vehicle driving at the back when the vehicle driving at the back is determined to be present; generating, by the RSE, the reception BSM including the warning level, the neighboring vehicle information, and the speed limit, as the driving limit information; and transmitting, by the RSE, the reception BSM to each vehicle of which the vehicle speed exceeds the speed limit through the WAVE communication.

In an automatic speed controllable vehicle and a speed controlling method thereof according to exemplary embodiments of the present invention, vehicle information collected by a vehicle is transmitted to RSE, and the RSE receives vehicle information from each vehicle within a management section, and differently provides each vehicle with information required for each vehicle to control a speed based on a current speed of each vehicle and whether a neighboring vehicle is present. The vehicle may adjust the speed based on the received information, a speed limit within the management section, whether the neighboring vehicle is present, and a position and a speed of the neighboring vehicle, and may display a warning notification for a driver. Accordingly, it is possible to prevent a traffic accident and to reduce traffic jam.

The foregoing summary is illustrative only and is not intended to be in any way limiting. In addition to the illustrative aspects, embodiments, and features described above, further aspects, embodiments, and features will become apparent by reference to the drawings and the following detailed description.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The accompanying drawings exemplifying exemplary embodiments of the present invention and contents described in the accompanying drawings need to be referred to, in order to sufficiently understand the present invention and operational advantages of the present invention and objects achieved by implementing the present invention.

Hereinafter, the present invention is described in detail by describing exemplary embodiments of the present invention with reference to the accompanying drawings. However, the present invention may be configured into various types of forms and thus, are not limited to the exemplary embodiments. To clearly describe the present invention, a portion irrelevant to the description is omitted and like reference numerals refer to like constituent elements in the drawings.

Throughout the specification, when a predetermined portion "includes/comprises" a predetermined constituent portion", it indicates that the predetermined portion does not exclude another constituent element and may further include the other constituent element unless differently described. The term such as "~unit", "~er/or", "module", "block", and the like, used in the specification indicates a unit configured to process at least one function or operation, which may be configured using hardware or software, or a combination of hardware and software.

Figure 1:
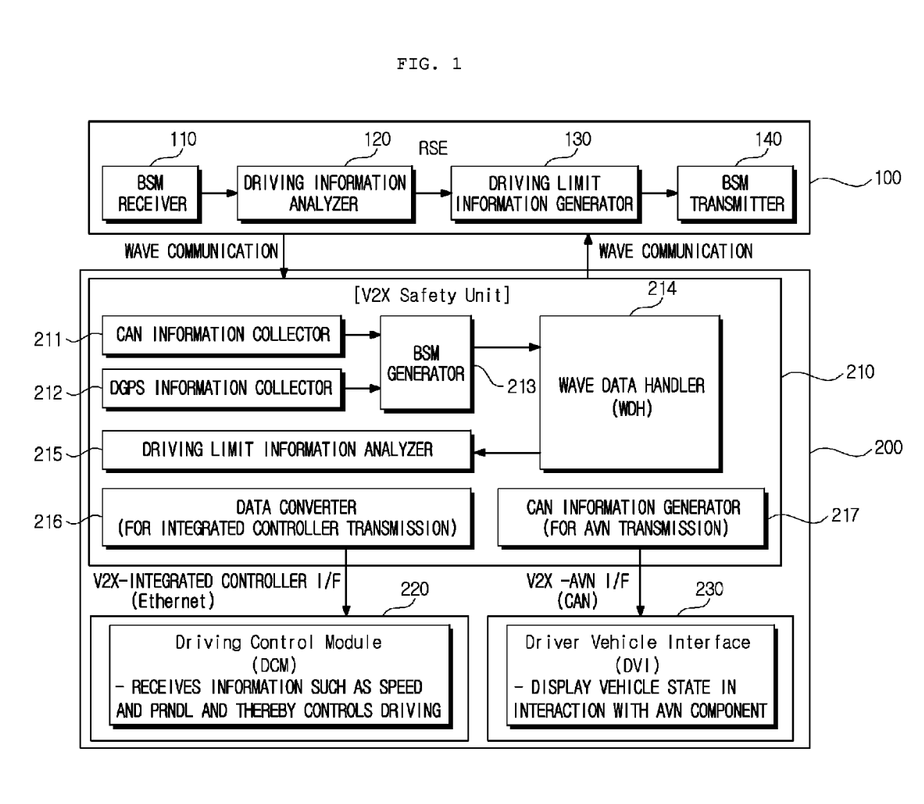
FIG. 1 illustrates a system for automatically controlling a speed of a vehicle according to an exemplary embodiment of the present invention.

FIG. 1 illustrates a system (hereinafter, an automatic vehicle speed controlling system) for automatically controlling a speed of a vehicle according to an exemplary embodiment of the present invention.

The automatic vehicle speed controlling system of the present invention illustrated in FIG. 1 may include roadside equipment (RSE) 100 configured to transmit and receive data based on a wireless access in vehicular environments (WAVE) communication and at least one vehicle 200. The WAVE communication uses a frequency of 5.85 to 5.925 GHz band, and transmits and receives data at a transmission rate of 10 Mbps within a communication radius of about 1 kilometer (km). The WAVE communication may support a vehicle to vehicle (V2V) communication and a vehicle to infrastructure (V2I) communication, may have a quick link access of 0.1 second or less, and may provide a high speed movement service. That is, the WAVE communication may provide a communication service to a vehicle moving at a high speed.

The RSE 100 is a traffic infrastructure and performs the WAVE communication with a vehicle. Since a communication radius of the WAVE communication is about 1 km, the RSE 100 is disposed around the roads to perform a smooth communication with a vehicle driving on the roads. In particular, the RSE 100 of the present invention may be generally disposed in an accident black spot in which the safety cognitive performance of drivers is deteriorated and thus, speeding frequently occurs.

The RSE 100 includes a basic safety message (BSM) receiver 110, a driving information analyzer 120, a driving limit information generator 130, and a BSM transmitter 140. The BSM receiver 110 receives, from the at least one vehicle 200, a BSM that is a data format of the WAVE communication.

The driving information analyzer 120 analyzes the BSM received by the BSM receiver 110 and obtains driving information of a vehicle. As the driving information of the vehicle, the driving information analyzer 120 verifies the number of vehicles performing communication based on an ID of each BSM transmitted from the at least one vehicle 200 and analyzes a speed and a position of each vehicle. That is, the driving information analyzer 120 may individually analyze, for each vehicle, driving information about at least one vehicle performing V2I communication and may also analyze, as section traffic information, driving information about the entire vehicles driving within a section (for example, 1 km) in which the RSE 100 performs the V2I communication. In the present invention, the section in which the RSE 100 performs the V2I communication with a vehicle is referred to as a management section of the RSE 100.

The driving limit information generator 130 generates driving limit information based on the driving information analyzed by the driving information analyzer 120 and pre-stored limit information. Here, the pre-stored limit information includes a speed limit set within the management section of the RSE 100. The speed limit of the management section may be set to be the same throughout the entire management section, and may be set to be different for each subsection by including subsections within the management section. The driving limit information generator 130 determines whether a driving speed of a vehicle is greater than or equal to the speed limit, based on the driving information and the limit information. When the driving speed is greater than or equal to the speed limit, the driving limit information generator 130 generates a BSM by including, in the driving limit information, warning data, such as warning of speeding and warning of an accident black spot, and the speed limit. Here, a warning level may be included in the warning data. The warning level may be variously set. For example, based on a speeding level, the warning level may be classified into three stages, "1" (speeding level is high) when a speed of the vehicle is faster than the speed limit by 80 km/h, "2" (speeding level is intermediate) when a difference between the speed of the vehicle and the speed limit is greater than or equal to 40 km/h and less than 80 km/h, and "3" (speeding level is low) when the difference between the speed of the vehicle and the speed limit is greater than or equal to 20 km/h and less than 40 km/h.

When not a single vehicle but a plurality of vehicles is present within the management section, the RSE 100 generates a BSM by including position information and speed information of a neighboring vehicle in the driving limit information as neighboring vehicle information.

The BSM transmitter 140 transmits, to the corresponding vehicle 200, the BSM generated by the driving limit information generator 130.

Although the BSM receiver 110 and the BSM transmitter 140 are separately illustrated in FIG. 1, the BSM receiver 110 and the BSM transmitter 140 may be integrated into a BSM communicator and thereby configured.

That is, the RSE 100 is disposed around the roads, particularly, the accident black spot, receives a BSM from the at least one vehicle 200 based on the WAVE communication, analyzes driving information of the at least one vehicle 200, generates driving limit information based on the analyzed driving information, and transmits the generated driving limit information to the vehicle 200.

Each of the at least one vehicle 200 includes a vehicle to everything (V2X) terminal 210, an integrated controller 220, and an interface unit 230. The V2X terminal 210 is a terminal configured to support an automatic vehicle control and safe driving provided to a driver by automatically recognizing, by the vehicle, a driving state and a road environment during driving, and performs the WAVE communication with the RSE 100. That is, the V2X terminal 210 transmits and receives the BSM to and from the RSE 100. The V2X terminal 210 transmits a BSM including the driving information to the RSE 100, and receives a BSM including the driving limit information from the RSE 100. The V2X terminal 210 analyzes the driving limit information, converts the driving limit information to control data and display data, and transmits the control data and the display data to the integrated controller 220 and the interface unit 230, respectively. The integrated controller 220 controls driving of the vehicle in response to the control data transmitted from the V2X terminal 210. The interface unit 230 outputs a vehicle state through an audio/video/navigation (AVN) system within the vehicle in response to the display data transmitted from the V2X terminal 210.

The V2X terminal 210 includes a controller area network (CAN) information collector 211, a differential global positioning system (DGPS) information collector 212, a BSM generator 213, a WAVE data handler (hereinafter, WDH) 214, a driving limit information analyzer 215, a data converter 216, and a CAN information generator 217.

The CAN information collector 211 collects vehicle information from various sensors within the vehicle using a CAN communication, and transmits the collected vehicle information to the BSM generator 213. Here, the vehicle information includes speed information of the vehicle. The DGPS information collector 212 obtains position information of the vehicle and transmits the obtained position information to the BSM generator 213. The BSM generator 213 receives the vehicle information transmitted from the CAN information collector 211 and the position information of the vehicle transmitted from the DGPS information collector 212, generates driving information, and generates a BSM that includes the driving information and is a data format suitable for the WAVE communication. The BSM generator 213 transmits the generated BSM to the WDH 214. The WDH 214 receives the BSM generated by the BSM generator 213 and transmits the BSM to the RSE 100, and receives a BSM transmitted from the RSE 100 and transmits the BSM to the driving limit information analyzer 215. Here, the BSM generated by the vehicle 200 may be configured as expressed by Table 1 according to a society of automotive engineers (SAE) J2735 standard. J2735 is a regulation relating to a dedicated short range communication (DSRC) message set dictionary.

TABLE 1

| Classification | Name | Type | Byte |
| --- | --- | --- | --- |
| Part I | msgID | DSRCmsgID | 1 |
|  | msgCnt | MsgCount | 1 |
|  | Id | TemporaryID | 4 |
|  | secMark | DSecond | 2 |
|  | Lat | Latitude | 4 |
|  | long | Longitude | 4 |
|  | elev | Elevation | 2 |
|  | accuracy | PositionalAccuracy | 4 |
|  | speed | TransmissionAndSpeed | 2 |
|  | heading | Heading | 2 |
|  | angle | SteeringWheelAngle | 1 |
|  | accelSet | AccelerationSet4Way | 7 |
|  | brakes | BrakeSystemStatus | 2 |
|  | size | VehicleSize | 3 |
| Part II |  | Optional |  |

A configuration of the BSM of the vehicle shown in Table 1 follows the aforementioned SAE J2735 standard. In Table 1, Part I relates to contents disclosed as essential elements that are to be necessarily included when transmitting the BSM and thus, a detailed description relating to each field is omitted. Part II relates to optional matters and is configured to be capable of setting an additional field based on circumstances.

Meanwhile, the BSM generated by the RSE 100 has not been proposed in the existing standard. Accordingly, the present invention proposes a BSM for RSE 100 by partially modifying the BSM for vehicle of Tablet, as expressed by Table 2, so that the at least one vehicle 200 may stably adjust the speed based on the BSM transmitted from the RSE 100.

TABLE 2

| Classification | Name | Type | Byte |
| --- | --- | --- | --- |
| Part I | msgID | DSRCmsgID | 1 |
|  | msgCnt | MsgCount | 1 |
|  | Id | TemporaryID | 4 |
|  | secMark | DSecond | 2 |
|  | Lat | Latitude | 4 |
|  | long | Longitude | 4 |
|  | elev | Elevation | 2 |
|  | accuracy | PositionalAccuracy | 4 |
|  | speed | TransmissionAndSpeed | 2 |

TABLE 2-continued

| Classification | Name | Type | Byte |
| --- | --- | --- | --- |
|  | angle | SteeringWheelAngle | 1 |
|  | accelSet | AccelerationSet4Way | 7 |
|  | warn | WarningLevel | 2 |
|  | limit | SpeedLimit | 3 |
| Part II |  | Optional |  |

When comparing the BSM for RSE proposed in Table 2 to the BSM for vehicle of Table 1, a difference can be found in three fields in Part I that is an essential constituent element of the BSM for vehicle. Initially, heading field included in the BSM for vehicle is omitted, and brakes and size fields are changed to warn field and limit field, respectively. Here, the warn field indicates a warning level based on the speeding level, and the limit field indicates a speed limit set within the management section of the RSE 100.

The driving limit information analyzer 215 receives the BSM received by the WDH 214 from the RSE 100, and analyzes driving limit information included in the BSM. The driving limit information analyzer 215 transmits, to the data converter 216 as control information, the speed limit and the neighboring vehicle information included in the driving limit information, and the warning level of warning data, and transmits the warning data to the CAN information generator 217. The data converter 216 converts the control information to control data suitable for a format required by the integrated controller 220 and transmits the control data to the integrated controller 220. The data converter 216 may perform communication with the integrated controller 220 using an Ethernet based user datagram protocol (UDP) communication.

Meanwhile, the CAN information generator 217 receives the warning data from the driving limit information analyzer 215, converts the warning data to display data suitable for a format required by the interface unit 230, and transmits the display data to the interface unit 230. In this instance, the CAN information generator 217 may transmit the display data using a CAN communication.

The integrated controller 220 automatically controls acceleration and brake pedals provided in the vehicle, based on the control data transmitted from the V2X terminal 210. That is, similar to the existing smart cruise control (SCC), the integrated controller 220 controls acceleration and deceleration of the vehicle, particularly, the deceleration. The integrated controller 220 may be configured as a driving control module (DCM) configured to control a speed and a gear in the vehicle.

The interface unit 230 received the display data from the CAN information generator 217 and transmits the display data to the AVN system provided in the vehicle. To output a warning notification, the interface unit 230 may convert the display data to data in a predetermined format corresponding to the AVN system, and may transmit the converted data. The interface unit 230 may be configured as a driver vehicle interface (DVI) configured to display a vehicle state in interaction with the AVN in the vehicle.

Figure 2:
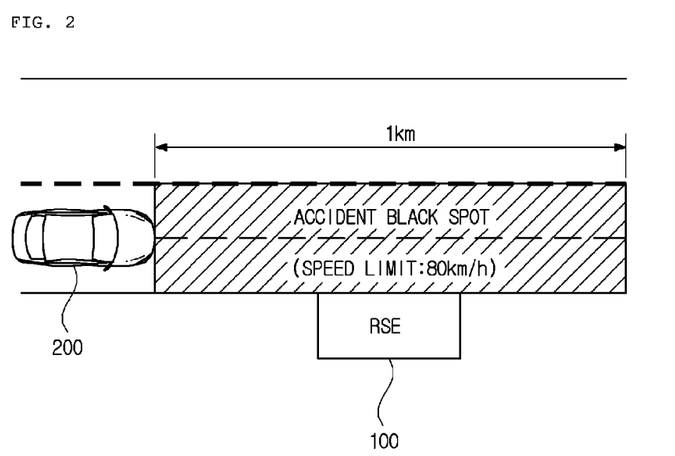
FIGS. 2 and 3 illustrate a concept of analyzing, by roadside equipment (RSE), driving information and generating driving limit information.
Figure 3:
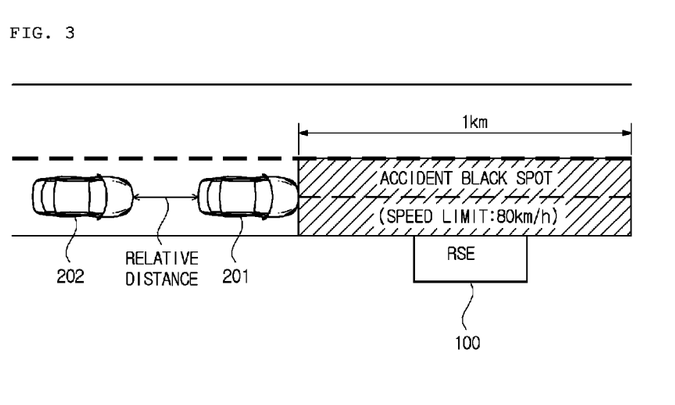

FIGS. 2 and 3 illustrate a concept of analyzing, by RSE, driving information and generating driving limit information. FIG. 2 illustrates a case in which a single vehicle is driving alone and FIG. 3 illustrates a case in which a plurality of vehicles is driving.

As illustrated in FIG. 2, in a case in which a single vehicle 200 is driving alone in a management section of the RSE 100, the CAN information collector 211 of the V2X terminal 210 collects vehicle information from various sensors within the vehicle using a CAN communication and the DGPS information collector 212 collects position information of the vehicle.

The collected vehicle information and position information is generated as a BSM by the BSM generator 213 and is stored in the WDH 214. The V2X terminal 210 transmits the BSM stored in the WDH 214 to the RSE 100 using a WAVE communication.

The RSE 100 receives and analyzes the BSM transmitted from the vehicle. A case in which a single vehicle is driving alone is assumed and thus, all of the BSMs received by the RSE 100 have the same ID. Accordingly, the RSE 100 may determine that only the single vehicle is present within the management section. That is, the RSE 100 may verify the number of vehicles within the management section. When the number of vehicles within the management section is only one, there is no need to consider the presence of other vehicles and thus, only the single vehicle and a speed limit within the management section may be considered. When the number of vehicles within the management section is determined to be one, the RSE 100 analyzes the received BSM and obtains speed information of the vehicle. The RSE 100 compares the obtained speed information with predetermined limit information and determines whether the speed information of the vehicle is greater than or equal to the speed limit included in the limit information. When the speed information is determined to be greater than or equal to the speed limit, the RSE 100 generates a BSM by including warning data and the speed limit in driving limit information and transmits the BSM to the vehicle 200 using the WAVE communication. Since other vehicles are absent within the management section, neighboring vehicle information is not included in the driving limit information.

The V2X terminal 210 of the vehicle 200 receives and analyzes the BSM transmitted from the RSE 100, obtains the speed limit and a warning level from the driving limit information, converts the speed limit and the warning level to data, and transmits the converted data to the integrated controller 220. The integrated controller 220 calculates a proper driving speed of the vehicle 200 based on the driving speed limit of the vehicle and the warning level, and controls the vehicle 200 to be decelerated to the calculated proper driving speed.

The integrated controller 220 calculates a deceleration level of the vehicle according to Equation 1.

$$RP = (SP_{cr} - SP_{lm})/(WL*10),  \quad \text{[Equation 1]}$$

Here, RP denotes the deceleration level, $SP_{cr}$ denotes a current driving speed of the vehicle, $SP_{lm}$ denotes a driving speed limit of the vehicle, and WL denotes the warning level.

The deceleration level of Equation 1 is a speed to gradually decelerate the vehicle instead of decelerating the vehicle to the speed limit at a time.

As illustrated in FIG. 2, in a case in which a distance of the management section of the RSE 100 is assumed as 1 km and the vehicle is driving at the speed limit of 80 km/h, an amount of time for the vehicle to pass through the management section is about 7 minutes. Therefore, the integrated controller 220 may determine a proper driving speed corresponding to an interval of 100 ms and may gradually decrease the speed of the vehicle.

As illustrated in FIG. 3, in a case in which a plurality of vehicles 201 and 202 is present within the management section of the RSE 100, the CAN information collector 211 of each of the plurality of vehicles 201 and 202 collects vehicle information from various sensors within a corresponding vehicle using the CAN communication and the DGPS information collector 212 collects position information and stores a BSM in the WDH 214. Next, the V2X terminal 210 of each of the plurality of vehicles 201 and 202 transmits the BSM stored in the WDH 214 to the RSE 100 using the WAVE communication.

The RSE 100 receives and analyzes BSMs transmitted from each of the plurality of vehicles 201 and 202. In this case, the BSMs received by the RSE 100 have different IDs based on corresponding vehicles. The RSE 100 verifies the number of vehicles within the management section based on the number of different IDs. Since the plurality of vehicles 201 and 202 is present within the management section, the RSE 100 analyzes the speed limit within the management section and a speed and a position of a neighboring vehicle. This is because in a case in which a speed of each of the plurality of vehicles 201 and 202 is adjusted in consideration of only the speed limit, particularly, in the case of a deceleration, a danger of an accident is present due to a speed difference with a vehicle located at the back and traffic jam may also occur.

Accordingly, when speed information with respect to at least one of the plurality of vehicles 201 and 202 is determined to be greater than or equal to the speed limit, the RSE 100 generates a BSM by including, in driving limit information, warning data, a driving limit speed of the vehicle, and speed information and position information of another vehicle, and transmits the generated BSM to the vehicle (for example, 201) of which speed information is greater than or equal to the speed limit using the WAVE communication.

The V2X terminal 210 of the vehicle 201 receives and analyzes the BSM transmitted from the RSE 100, obtains the driving limit speed, the position information of the neighboring vehicle 202, the speed information of the neighboring vehicle 202, and the warning level, converts the same to data, and transmits the converted data to the integrated controller 220. The integrated controller 220 calculates a deceleration level of the vehicle 201 based on the driving limit speed, the position information of the neighboring vehicle 202, the speed information of the neighboring vehicle 202, and the warning level, and controls the vehicle 201 to be decelerated based on the calculated deceleration level.

The integrated controller 220 initially calculates a relative distance and a relative speed with the neighboring vehicle 202 based on the position information and the speed information of the neighboring vehicle 202. In particular, the integrated controller 220 calculates a relative speed with a vehicle 202 present at the back. Here, the relative speed is calculated based on a difference between a current speed of the vehicle 201 and a speed of the vehicle 202 at the back. (Relative speed=current speed−speed of vehicle at the back)

When the relative speed has a positive value, that is, when the speed of the vehicle 202 at the back is slower than the current speed of the vehicle 201, a probability of an accident occurring due to the vehicle 202 at the back is small even in the case of a deceleration. Therefore, similar to a case in which a single vehicle is driving, the proper driving speed of the vehicle is calculated according to Equation 1.

However, when the relative speed has a negative value, that is, when the speed of the vehicle 202 at the back is faster than the current speed of the vehicle 201, a probability of a collision with the vehicle 202 at the back is present in the case of a quick deceleration of the vehicle 201. Accordingly, a relative acceleration with the vehicle 202 at the back is calculated. Similar to the relative speed, the relative acceleration is calculated based on a difference between a current acceleration of the vehicle 201 and an acceleration of the vehicle 202 at the back. (Relative acceleration=current acceleration−acceleration of vehicle 202 at the back)

The integrated controller 220 calculates a deceleration level of the vehicle 201 according to Equation 2 in consideration of the relative acceleration.

$$RS = (|(\text{relative acceleration}/10)| * (SP_{cr} - SP_{lm}))/(WL*10),$$ [Equation 2]

Here, RS denotes the deceleration level, $SP_{cr}$ denotes the current driving speed of the vehicle, $SP_{lm}$ denotes the driving speed limit of the vehicle, and WL denotes the warning level.

That is, compared to Equation 1, the relative acceleration is additionally reflected. A deceleration interval of the vehicle 201 is determined by considering a relative distance. This is because when the relative distance is short, a probability of a collision occurring due to a deceleration is high.

When a longitudinal difference between two vehicles 201 and 202 is A and a latitudinal difference therebetween is B by analyzing position information of the two vehicles 201 and 202, the relative distance is calculated according to Equation 3 by changing each of A and B as an angle (radian).

$$dx = R * \cos B * A$$

$$dy = R * B$$

$$r = \sqrt{dx^2 - dy^2}$$ [Equation 3]

Here, R denotes the radius of the earth (about 6370 km).

When the relative distance is calculated, a relative ratio is obtained based on a relative ratio table.

The relative ratio table may be set as Table 1, as an example.

TABLE 3

| Relative distance | Exceeding 100 m and 300 m or less | Exceeding 100 m and 200 m or less | 100 m or less |
|---|---|---|---|
| Relative ratio | 2 | 4 | 5 |

When the relative ratio (RR) is calculated, a deceleration interval (RP) is calculated according to Equation 4.

$$RP = 100 \text{ ms}/RR$$ [Equation 4]

Accordingly, the integrated controller 220 continuously decelerates the vehicle 201 based on the deceleration level calculated according to Equation 3, at a unit of the deceleration interval calculated according to Equation 4. Such deceleration of the vehicle 201 is not performed only once and is performed every time a BSM is received by performing communication with the RSE 100. Consequently, the vehicle 201 may be decelerated up to the speed limit. In this instance, the vehicle 202 at the back is also decelerated by performing communication with the RSE 100. Accordingly, it is possible to prevent an accident and to decrease the occurrence of traffic jam since a sudden change does not arise in a traffic flow.

Figure 4:
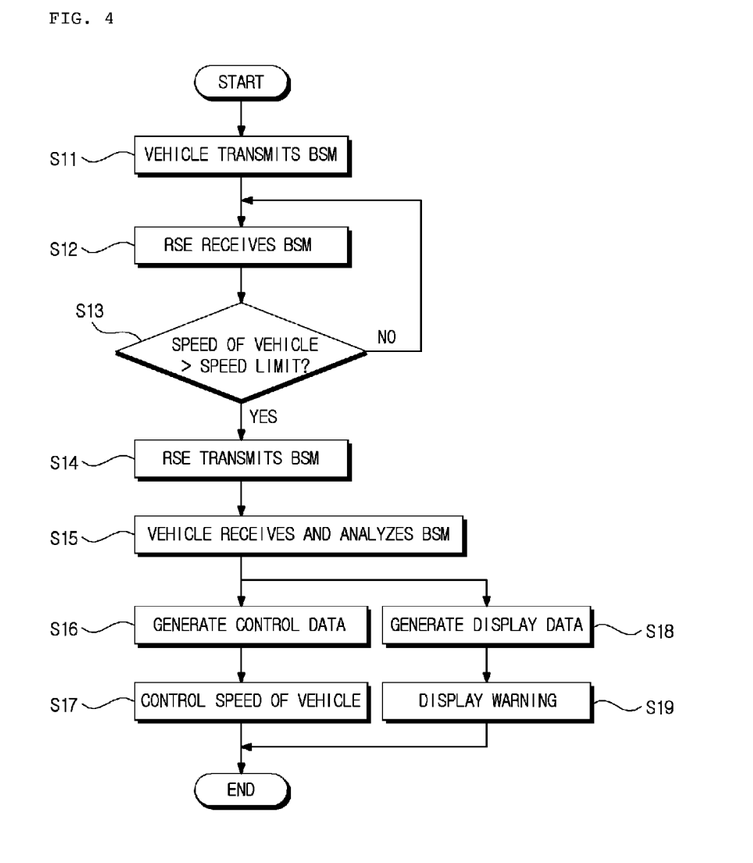
FIG. 4 illustrates a method of automatically controlling a speed of a vehicle according to an exemplary embodiment of the present invention.

FIG. 4 illustrates a method of automatically controlling a speed of a vehicle according to an exemplary embodiment of the present invention.

Describing the method of automatically controlling a speed of a vehicle with reference to FIGS. 1 and 4, each of the at least one vehicle 200 generates a BSM based on vehicle information and position information of the vehicle 200 collected by the V2X terminal 210, and transmits the generated BSM to the RSE 100 using a WAVE communication (S11).

The RSE 100 receives and analyzes the BSM transmitted from each of the at least one vehicle 200 (S12). The RSE 100 analyzes an ID of the BSM, verifies the number of vehicles within the management section, and determines whether a vehicle speed included in the received BSM exceeds a predetermined speed limit (S13). When the vehicle speed does not exceed the speed limit, the RSE 100 receives a BSM transmitted from the vehicle again (S12). However, when the vehicle speed is determined to exceed the speed limit, the RSE 100 generates a BSM including driving limit information and transmits the BSM to the corresponding vehicle 200 (S14). Here, when the number of vehicles within the management section is one, the RSE 100 generates a BSM by including warning data and the speed limit in the driving limit information. When the number of vehicles within the management section is plural, the RSE 100 generates a BSM by further including, in the driving limit information as neighboring vehicle information, position information and speed information of the neighboring vehicle. A warning level is included in the warning data.

The V2X terminal 210 of the vehicle 200 receives and analyzes the BSM transmitted from the RSE 100 (S16). The V2X terminal 210 obtains the speed limit and the neighboring vehicle information from the driving limit information included in the BSM, generates control data, and transmits the control data to the integrated controller 220 (S16). The integrated controller 220 controls the speed of the vehicle in response to the control data (S17). In this instance, the integrated controller 220 may differently control the speed of the vehicle based on whether the neighboring vehicle information is included in the control data, particularly, whether a vehicle at the back is present.

Meanwhile, the V2X terminal 210 of the vehicle 200 obtains warning data from the driving limit information included in the BSM, generates display data, and transmits the display data to the interface unit 230. Accordingly, the interface unit 230 transmits the display data to the AVN system for outputting the display data as a warning notification, and the AVN system displays the warning notification (S19).

Consequently, in the system and method for automatically controlling a speed of a vehicle according to the present invention, vehicle information collected by a vehicle is transmitted to an RSE, and the RSE receives vehicle information from each vehicle within a management section and transmits again, to each vehicle, information required for each vehicle to adjust a speed. In this instance, the RSE differently provides information required to control the speed based on a current speed of each vehicle and whether a neighboring vehicle is present. The vehicle receiving information required to adjust the speed may adjust the speed of the vehicle based on the received information and may display a warning notification for a driver. Here, each vehicle may adjust the speed in consideration of whether the neighboring vehicle is present and a position and a speed of the neighboring vehicle as well as the speed limit within the management section. Accordingly, it is possible to prevent a traffic accident and to reduce a traffic jam.

Although a message and a BSM transmitted from the vehicle to the RSE and a message and a BSM transmitted from the RSE to the vehicle are not separately classified, the message and the BSM transmitted from the vehicle to the RSE may be referred to as a transmission message and a transmission BSM, respectively, and the message and the BSM transmitted from the RSE to the vehicle may be referred to as a reception message and a reception BSM, respectively.

The method according to the present invention may be configured as a computer-readable code in computer-readable recording media. The computer-readable recording media may include any type of recording devices storing data readable by a computer system. Examples of the computer-readable recording media may include ROM, RAM, CD- ROM, magnetic tapes, floppy disks, optical data storage devices, and the like, and may also include carrier wave forms (for example, transmission over the Internet). The computer-readable recording media may store and execute a code distributed over a computer system connected to a network and thereby readable by a computer using a distributed method.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A vehicle control comprising:
    a vehicle to everything (V2X) terminal configured to
       collect driving information from vehicles,
       transmit a transmission message to roadside equipment (RSE), and
       generate control data and display data
       wherein the RSE analyzes the number of vehicles within a management section, position information, and speed information from the driving information and transmits a reception message about driving limit information including a speed limit of the management section and neighboring vehicle information to at least a vehicle,
       wherein the V2X analyzes the driving limit information from the RSE and converts the driving limit information to control data and display data;
    an integrated controller configured to
       receive the control data,
       calculate a deceleration level, and
       gradually decelerate a speed of a vehicle to be less than or equal to the speed limit based on the calculated deceleration level; and
    an interface unit configured to receive the display data, and to transmit the received display data to an audio/video/navigation (AVN) system capable of displaying a warning notification for a driver, wherein the management section comprises subsections for the setting of speed limits in the management section.

2. The vehicle control of claim 1, wherein the V2X terminal comprises:
    a controller area network (CAN) information collector configured to collect vehicle information including the vehicle speed from a plurality of sensors within the vehicle using a CAN communication;
    a differential global positioning system (DGPS) information collector configured to obtain position information of the vehicle;
    a basic safety message (BSM) generator configured to receive the vehicle information and the position information, to obtain the driving information, and to generate the driving information as a transmission BSM that is the transmission message corresponding to a wireless access in vehicular environments (WAVE) communication format;
    a WAVE data handler configured to receive the transmission BSM, to transmit the transmission BSM to the RSE, and to receive a reception BSM transmitted from the RSE;
    a driving limit information analyzer configured to receive the reception BSM, and to obtain the speed limit and the neighboring vehicle information included in the reception BSM, and warning data;
    a data converter configured to convert, to the control data, the speed limit, the neighboring vehicle information, and a warning level included in the warning data, and to transmit the control data to the integrated controller; and
    a CAN information generator configured to transmit the display data to the interface unit through the CAN communication.

3. The vehicle control of claim 1, wherein when the neighboring vehicle information is not included in the control data, the integrated controller calculates the deceleration level according to an equation:

$$RP=(SP_{cr}-SP_{lm})/(WL*10),$$

where RP denotes the deceleration level, $SP_{cr}$ denotes a current driving speed of the vehicle, $SP_{lm}$ denotes a driving speed limit of the vehicle, and WL denotes a warning level, and decelerates the speed of the vehicle based on the calculated deceleration level.

4. The vehicle control of claim 1, wherein when the neighboring vehicle information is included in the control data, the integrated controller calculates a relative speed that is a difference between the vehicle speed of the vehicle information and a speed of a vehicle at the back included in the neighboring vehicle information, and when the relative speed has a negative value, calculates the deceleration level in consideration of a relative acceleration that is a difference between an acceleration of the vehicle and an acceleration of the vehicle at the back according to an equation:

$$RS=(|(\text{relative acceleration}/10)|*(SP_{cr}-SP_{lm}))/(WL*10),$$

where RS denotes the deceleration level, $SP_{cr}$ denotes a current driving speed of the vehicle, $SP_{lm}$ denotes a driving speed limit of the vehicle, and WL denotes a warning level, and decelerates the speed of the vehicle based on the calculated deceleration level.

5. The vehicle control of claim 1, wherein when information about a vehicle at the back is included in the neighboring vehicle information, the integrated controller adjusts a deceleration interval based on a relative distance between the vehicle and the vehicle at the back.

6. The vehicle control of claim 1, wherein the RSE receives a transmission BSM, analyzes driving information of each of an at least one vehicle, obtains the number of vehicles within the management section, the position information, and the speed information from the driving information, generates the neighboring vehicle information including the position information and the driving information of another vehicle based on each of the at least one vehicle, generates a reception BSM that is the reception message including the neighboring vehicle information and the speed limit and warning data predetermined and thereby stored, and transmits the reception BSM.

7. The vehicle control of claim 1, wherein the RSE generates a reception BSM about a vehicle of which a driving speed is greater than or equal to the speed limit among an at least one vehicle, and transmits the reception BSM.

8. The vehicle control of claim 1, wherein the interface unit receives the display data, converts the display data to a format capable of being output on the AVN system, and transmits the converted display data.

9. A method of controlling a speed of at least one vehicle configured to perform communication with Road Side Equipment (RSE) using a Wireless Access in Vehicular Environments (WAVE) communication, the method comprising:
   collecting, by each of the at least one vehicle, driving information including speed information and position information of a vehicle, generating a transmission Basic Safety Message (BSM) corresponding to a WAVE communication format, and transmitting the transmission BSM to the RSE;
   receiving, by each of the at least one vehicle, a reception BSM that is transmitted from the RSE by analyzing the number of vehicles within a management section and driving information of each of the at least one vehicle, and by including driving limit information and neighboring vehicle information; and
   obtaining, by each of the at least one vehicle, a speed limit of the management section included in the driving limit information and the neighboring vehicle information, calculating a deceleration level based on a current speed of a vehicle exceeding the speed limit and the speed limit, and decelerating the speed of the vehicle based on the calculated deceleration level,
   wherein the management section comprises subsections for the setting of speed limits in the management section.

10. The method of claim 9, wherein the receiving of the reception BSM comprises:
   receiving, by the RSE, the transmission BSM from each of the at least one vehicle, and analyzing the number of vehicles within the management section of the RSE and the driving information of each of the at least one vehicle;
   determining, by the RSE, whether a speed of each of the at least one vehicle exceeds the predetermined speed limit;
   obtaining, by the RSE, a warning level corresponding to the speed of the vehicle exceeding the speed limit in the driving information from among a plurality of predetermined warning levels;
   determining, by the RSE, whether a vehicle driving at the back of the vehicle of which the vehicle speed exceeds the speed limit is present within the management section;
   obtaining, by the RSE, neighboring vehicle information including position information and speed information of the vehicle driving at the back when the vehicle driving at the back is determined to be present;
   generating, by the RSE, the reception BSM including the warning level, the neighboring vehicle information, and the speed limit as the driving limit information;
   transmitting, by the RSE, the reception BSM to each vehicle exceeding the speed limit through the WAVE communication; and
   receiving, by the vehicle of which the vehicle speed exceeds the speed limit among the at least one vehicle, the reception BSM.

11. The method of claim 9, wherein the decelerating of the speed comprises:
   obtaining, by a V2X terminal of the vehicle of which the vehicle speed exceeds the speed limit, the speed limit, the neighboring vehicle information, and a warning level corresponding to the speed of the vehicle from among a plurality of warning levels predetermined at the RSE, from the driving limit information included in the reception BSM, and generating control data;
   receiving, by an integrated controller of the vehicle of which the vehicle speed exceeds the speed limit, the control data from the V2X terminal, and when the neighboring vehicle information is not included in the control data, calculating the deceleration level according to an equation:

$$RP = (SP_{cr} - SP_{lm})/(WL*10),$$

where RP denotes the deceleration level, $SP_{cr}$ denotes a current driving speed of the vehicle, $SP_{lm}$ denotes a driving speed limit of the vehicle, and WL denotes the warning level; and
   decelerating the speed of the vehicle based on the calculated deceleration level.

12. The method of claim 9, wherein the decelerating of the speed comprises:
   obtaining, by a V2X terminal of the vehicle of which the vehicle speed exceeds the speed limit, the speed limit, the neighboring vehicle information, and a warning level corresponding to the speed of the vehicle from among a plurality of warning levels predetermined at the RSE, from the driving limit information included in the reception BSM, and generating control data;
   receiving, by an integrated controller of the vehicle of which the vehicle speed exceeds the speed limit, the control data from the V2X terminal, and when the neighboring vehicle information is included in the control data, calculating a relative speed that is a difference between the vehicle speed of the vehicle information and a speed of a vehicle at the back included in the neighboring vehicle information, and when the relative speed has a negative value, calculating the deceleration level in consideration of a relative acceleration that is a difference between an acceleration of the vehicle and an acceleration of the vehicle at the back according to an equation:

$$RS = (|(\text{relative acceleration}/10)|*(SP_{cr} - SP_{lm}))/(WL*10),$$

where RS denotes the deceleration level, $SP_{cr}$ denotes a current driving speed of the vehicle, $SP_{lm}$ denotes a driving speed limit of the vehicle, and WL denotes the warning level; and
   decelerating the speed of the vehicle based on the calculated deceleration level.

13. The method of claim 9, wherein the decelerating of the speed comprises adjusting a deceleration interval based on a relative distance between the vehicle and a vehicle at the back when information about the vehicle at the back is included in the neighboring vehicle information.

* * * * *